Figure 1:
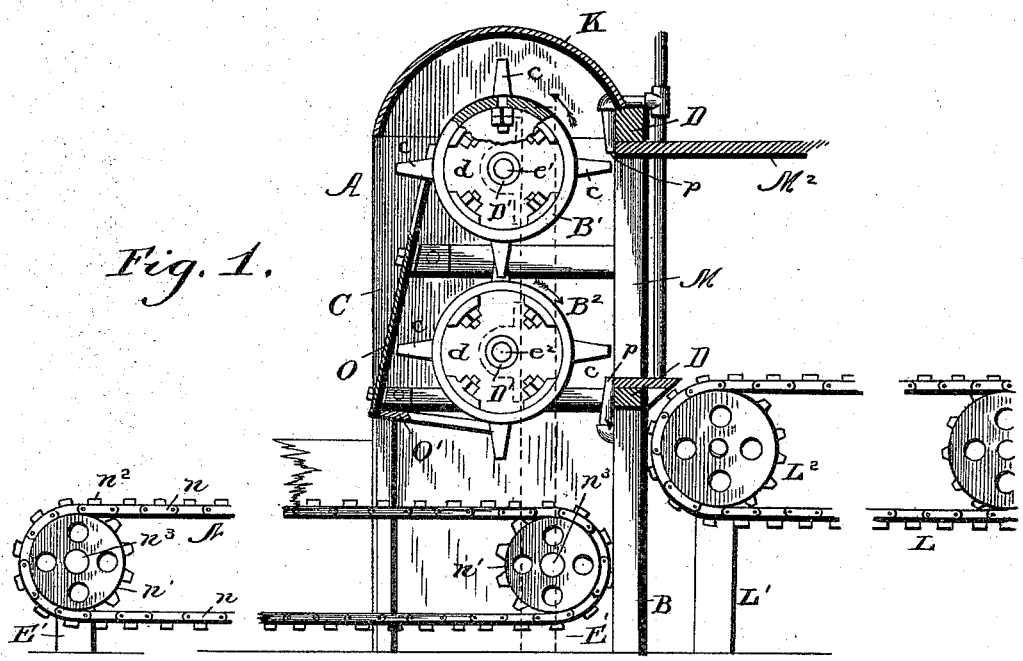

(No Model.) 2 Sheets—Sheet 1.

G. M. GILLET.
MACHINE FOR CLEANING AND SEPARATING BALED HAY.

No. 537,764. Patented Apr. 16, 1895.

Witnesses:
J. B. McGirr.
W. Darrell.

Inventor
George M. Gillet
by Connolly Bros
Attys (No Model.) 2 Sheets—Sheet 2.
G. M. GILLET.
MACHINE FOR CLEANING AND SEPARATING BALED HAY.
No. 537,764. Patented Apr. 16, 1895.
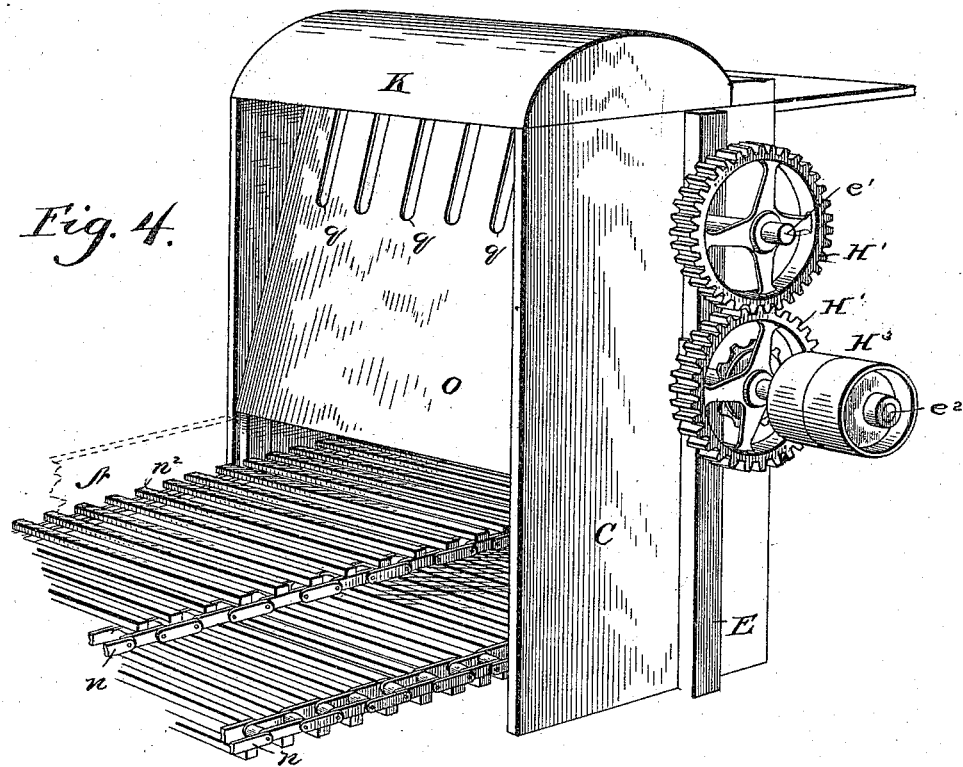
Witnesses:
Inventor
George M. Gillet
by Connally Bros.
Attys

UNITED STATES PATENT OFFICE.

GEORGE MARTIN GILLET, OF BALTIMORE, MARYLAND.

MACHINE FOR CLEANING AND SEPARATING BALED HAY.

SPECIFICATION forming part of Letters Patent No. 537,764, dated April 16, 1895.

Application filed December 15, 1894. Serial No. 531,926. (No model.)

*To all whom it may concern:*

Be it known that I, GEORGE MARTIN GILLET, a citizen of the United States, residing in the city of Baltimore and State of Maryland, have invented certain new and useful Improvements in Machines for Cleaning and Separating Baled Hay; and I do hereby declare the following to be a full, clear, and exact description of the invention, such as will enable others skilled in the art to which it appertains to make and use the same.

This invention has relation to the methods and machinery for cleaning and shaking block baled hay, and making it ready for cutting or feeding purposes, and has for its object the provision of novel means for effecting automatically with great rapidity the work usually performed by hand labor.

Ordinarily in the shaking and cleaning of baled hay, the bales containing the long hay have been opened by cutting the binding cords and then pulling apart and loosening the strands by hand. This operation is very slow and expensive, involving, as it does, wherever the work is conducted on a large scale, the labor of several men. So far as I am aware no attempt has heretofore been made to perform this work by machinery, or to avoid the slow and tedious means above stated.

My invention contemplates the construction of a machine or apparatus which shall be particularly designed and adapted for use in places where hay or straw is taken from the bales and cut up into short lengths and afterward baled as short hay.

The machine embodying my invention is intended to take the long hay or straw from the untied bale, by suitable appliances, to separate and shake the fibers, and to then deliver the hay thus separated to a traveling apron which will convey it to the neighborhood of the cutting machine.

In the machine embodying my invention, which I shall hereinafter describe in detail, I employ as a means for separating and shaking the hay from the bale two large revolving cylinders provided each with four rows or sets of teeth placed diagonally projecting from the peripheries of the cylinders. These cylinders are mounted upon a suitable frame-work one above the other with an intervening space, and are arranged in such relation to a traveling feeding apron arranged to deliver the hay to the cutting machine, that the hay will be pulled from the bale by the teeth of the revolving cylinders, the fibers or strands torn apart, one portion of the hay drawn up and over the upper cylinder, another portion drawn down and below the lower cylinder and both portions dropped upon the carrying apron which conveys the hay to the cutting machine.

For the purpose of slightly moistening the hay so as to render it soft and pliable, and so as to prevent the raising of dust, the machine is provided with tubes, or nozzles, on suitable pipes leading from the source of the steam supply and entering the machine above and below its supply opening or mouth. The delivery apron and the feeding apron consist each of an endless slatted belt formed of chains and transverse slats and mounted on sprocket wheels which engage with the chains and impart to the aprons movement in the proper direction.

My invention consists in the novel construction, combination, and arrangement of the several structural elements hereinafter set forth.

Figure 2:
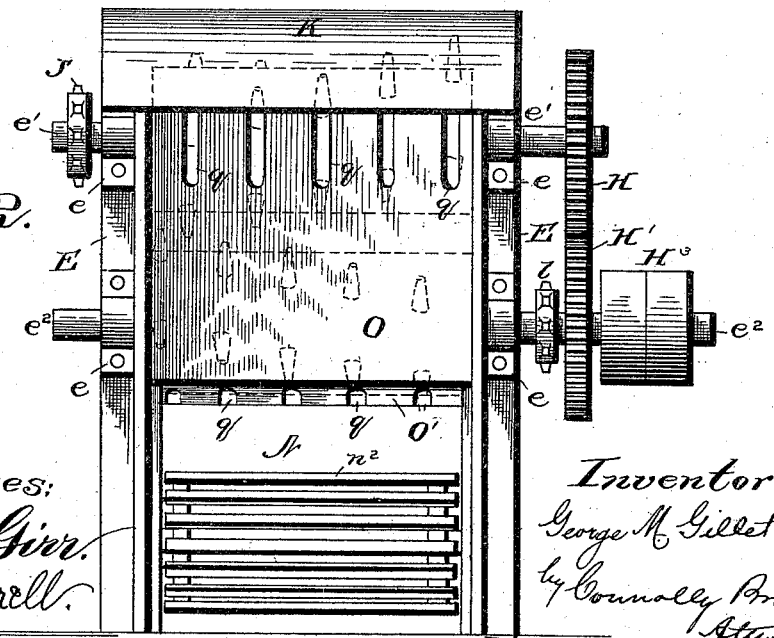

In the accompanying drawings, Figure 1 is a vertical longitudinal sectional view of my improved machine. Fig. 2 is a front elevation of the same; Fig. 3, a detail plan view of one of the cylinders, and Fig. 4 a perspective view of the machine.

A, designates the main frame of the machine, which is in the form of an upright, rectangular box or casing, composed of the corner standards, B, B, the side walls, C, C, and the cross timbers, D, D.

E, E, are standards located on the outside of the casing, A, nearly midway between the front and back of the casing, and $e$, $e$, are journal boxes secured to said standards for the purpose of supporting and giving bearing to the shafts $e'$ $e^2$ of the toothed cylinders by which the separation and shaking of the unbaled hay are effected.

$B'$, designates the upper cylinder, and $B^2$, the lower cylinder arranged horizontally within the frame work or casing of the machine, and in the position shown in the drawings. These cylinders may be made of any suitable material, but are preferably iron tubes having flanged heads, $d$, which are bolted to the cylinders and formed with centrally bossed openings D' for the passage of the shafts $e'$, $e^2$, which are keyed or otherwise secured to the heads, $d$. These heads are removable by taking out the bolts which secure them to the cylinders so as to allow access to the interior of the cylinders for the purpose of tightening up or removing the teeth of the cylinders. The teeth, $c$, consist of conical or tapering pins, having threaded shanks, and are fastened to the cylinders by passing the shanks through suitable holes in the walls of the cylinders and turning nuts on the threaded shanks and tightening said nuts against the inner surface of the cylinders. Each cylinder is provided with four rows of such teeth, the rows being spiral or oblique, so that in grasping and tearing apart the fibers of the baled hay the action may be gradual and no more hay taken at a time than can be accommodated by the capacity of the machine. The toothed cylinders are intended to rotate in opposite directions, as indicated by arrows, and for this purpose are geared together at one end of the machine by the gear wheels, H'. The shaft of the lower cylinder has mounted on one end the fast and loose pulleys, $H^3$, through which power is conveyed to the cylinders. Upon one end of the shaft of the upper cylinder is mounted a sprocket wheel, J, through which power is conveyed by a chain to the inner shafts of the carrying off apron. A similar sprocket wheel, $l$, is mounted on the shaft of the lower cylinder and engages with the chain which drives the sprocket wheel on the feeding apron.

L, designates the feeding apron, which is located in the front of the machine, the shafts of the driving sprocket wheels being mounted in suitable standards, L'. This apron consists of a pair of endless chains traveling over sprocket wheels, $L^2$, $L^2$, and connected laterally by slats. The upper surface of this apron is on a plane a little below the horizontal line through the center of the lower cylinder and at the bottom of the delivery mouth, M, of the machine, such delivery mouth being an opening, or space, in the frame work or casing, for the admission of the hay. At the bottom or this opening there is located an iron feeding plate or table, M', upon which the blocks of bales of hay are delivered from the feeding apron which comes close up to the mouth of the machine. The delivery mouth or opening of the machine, is provided with a hood or shield, $M^2$, which prevents the hay, when the bale is being torn apart and its fibers separated, from being thrown away from the mouth of the machine, and N, designates the delivery or carrying off apron, which is similar in construction to the feeding apron, and comprises endless chains, $n$, running over sprocket wheels $n'$ $n'$ and connected together by slats, $n^2$. Sprocket wheels, $n'$, are mounted on shafts, $n^3$, which have their bearings in boxes, on the uprights, E. The sprocket wheels, $n'$, are within the lower portion of the machine, and the traveling of the upper and outgoing portion of the apron is from a point below the toothed cylinders to the point of delivery, the latter being properly in the neighborhood of the cutting machine for cutting the hay into short lengths.

The hay to be separated and cleaned is laid in a block or bale upon the feeding apron, L, and the bands or cords, binding the same, being cut, the bale is moved slowly forward until it enters the mouth of the machine and comes in contact with the teeth of the revolving cylinders. As before stated these cylinders revolve in opposite directions, and the hay is taken from the bale, one portion drawn down below the lower cylinder and the other portion drawn up over the upper cylinder. The hay drawn down by the lower cylinder is delivered at once to the delivery apron, while that which is carried by the upper cylinder is forced outward and caused to fall down over an inclined shield or partition, O, upon the delivery apron. From the lower edge of the shield, O, which may consist of a plate of iron securely bolted to the frame-work of the machine, a supplementary shield, O', extends inwardly below the lower cylinder so that its upper surface is nearly in contact with that of the lower cylinder. The shields O, O', prevent the hay from being drawn or dragged farther than is necessary for depositing it upon the delivery apron, and the upper edge of the shield, O, and inner edge of the shield, O' are formed with kerfs or channels $q$ through which the teeth of the cylinders pass as the cylinders rotate, so that any hay which becomes attached to the teeth, and which would otherwise be drawn back into machine will be removed and caused to fall upon the delivery apron. The fine particles, such as clover heads, broken stems, and the like, which are gathered up by the cylinders and thrown upon the delivery apron, will fall through the spaces between the slats of the latter so that nothing but clean and merchantable hay will be carried to the cutting machine.

K, designates a segmental cap, which may be made properly of sheet iron, and which is hinged to the front cross timber, D, of the machine, and so arranged as to form a yielding cover to the space above the upper cylinder. The hay carried by the upper cylinder passes through the space between such cylinder and the cap, K, which latter serves to prevent the hay from being scattered, but, being hinged and yielding, is easily lifted to relieve the space from any undue accumulation, and prevent clogging.

$p$, designates nozzles leading into the space of the machine through which the cylinders rotate and connected to any suitable source of steam supply. These nozzles are intended to supply a small quantity of steam during the operation of the machine so as to moisten the hay as it is gathered from the bales, and prevent the rising of dust, as well as to render the hay soft and pliable, therefore better adapted to be fed to and operated upon by the cutters. I have shown two of these nozzles within and above the delivery mouth of the machine, and two within and below the delivery mouth; but such nozzles or other appliances for supplying steam may be located in any other convenient position.

I claim—

1. In a machine for cleaning and shaking block baled hay, the combination with revolving toothed cylinders arranged and adapted to revolve from each other on the feeding side of the machine of means for feeding bales of hay thereto, substantially as described.

2. In a machine for cleaning and separating block baled hay, the combination of a suitable framing, toothed cylinders journaled in said framing and means for revolving said cylinders outwardly in opposite directions, on the feeding side of the machine, with a feeding apron adapted to deliver the bale against both cylinders, and a delivery apron adapted to convey the separated hay away from the cylinders, substantially as described.

3. In a machine for cleaning and separating baled hay, the combination with revolving toothed cylinders, mechanism for rotating them from each other on the feeding side of the machine, and feeding mechanism adapted to deliver the bales to said cylinders, of a steam jet arranged in front of the cylinders to inject steam into the hay before it reaches the cylinders, substantially as described.

4. In a machine for separating baled hay, the combination of reversely moving cylinders having spirally arranged teeth, with feeding and delivery devices on opposite sides, the cylinders being arranged and adapted to turn outward from each other on the feeding side of the machine, substantially as described.

5. A machine for separating baled hay, comprising a closed chest or casing, having inlet and delivery openings on opposite sides, feeding and delivery aprons leading to and from said openings, respectively; a pair of toothed cylinders located opposite the inlet opening and above the delivery apron, and mechanism for rotating said cylinders from each other on the feeding side of the machine.

6. A machine for separating baled hay, comprising a suitable closed casing or chest A, with a yielding hood K, inlet and discharge openings on opposite sides of the machine; a pair of toothed cylinders B', B², located opposite the inlet opening M, and above the discharge opening, means for rotating said cylinders outwardly from each other on the inlet side of the machine, and slotted combing shields or plates O, O', substantially as described.

In testimony whereof I have affixed my signature in presence of two witnesses.

GEO. MARTIN GILLET.

Witnesses:
 THOMAS A. CONNOLLY,
 JOS. B. CONNOLLY.